United States Patent
Möller et al.

(10) Patent No.: US 7,240,830 B2
(45) Date of Patent: Jul. 10, 2007

(54) LAYERED SIM CARD AND SECURITY FUNCTION

(75) Inventors: Bernd Möller, Genarpsvägen (SE); Matthias Esswein, Kalchrouth (DE); Rickard Svedenmark, Malmö (SE); Elmar Kirchner, Nürenberg (DE); Bernard Smeets, Dalby (SE); Michael Bock, Georgensgmünd (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/360,011

(22) Filed: Feb. 7, 2003

(65) Prior Publication Data

US 2004/0026517 A1    Feb. 12, 2004

Related U.S. Application Data

(60) Provisional application No. 60/357,291, filed on Feb. 15, 2002, provisional application No. 60/412,756, filed on Sep. 23, 2002, provisional application No. 60/412,763, filed on Sep. 23, 2002.

(51) Int. Cl.
 G06K 5/00     (2006.01)
 G06F 5/00     (2006.01)
 H04L 9/00     (2006.01)

(52) U.S. Cl. ............... 235/380; 713/172; 235/375; 235/492

(58) Field of Classification Search .......... 235/382, 235/492, 380, 375; 713/172; 702/189; 380/25
See application file for complete search history.

(56) References Cited

U.S. PATENT DOCUMENTS

| | | | | |
|---|---|---|---|---|
| 5,689,565 A |    | 11/1997 | Spies et al. | 380/25 |
| 6,005,942 A | * | 12/1999 | Chan et al. | 713/187 |
| 6,216,227 B1 | * | 4/2001 | Goldstein et al. | 713/172 |
| 6,269,396 B1 |   | 7/2001 | Shah et al. | 709/223 |
| 6,296,191 B1 | * | 10/2001 | Hamann et al. | 235/492 |

(Continued)

FOREIGN PATENT DOCUMENTS

EP    1 074 911 A2    2/2001

(Continued)

OTHER PUBLICATIONS

Computer Science 124: Introduction to Programming Using Java Second Edition, Fall 1998, an online textbook by David J. Eck at the Department of Mathematics and Computer Science at Hobart and William Smith Colleges, and available at the website http://math.hws.edu/eck/cs124/javanotes2/, section 4.2, entitled "Inheritance and Polymorphism."*

(Continued)

Primary Examiner—Daniel A. Hess
(74) Attorney, Agent, or Firm—Michael Cameron, Esq.

(57) ABSTRACT

A smart card and a smart card and security function system for a mobile terminal for a wireless telecommunications system. The smart card includes a software services component in which software is organized in at least one functional software unit and in a plurality of software layers arranged in order from software layers providing higher level services to software layers providing lower level services, and at least one software module in each software layer. The smart card further includes means for providing access to information and services provided by the smart card.

2 Claims, 5 Drawing Sheets

U.S. PATENT DOCUMENTS

| | | | |
|---|---|---|---|
| 6,317,659 B1 | 11/2001 | Lindsley et al. | 701/1 |
| 6,339,765 B1 * | 1/2002 | Maher | 705/41 |
| 6,418,420 B1 * | 7/2002 | DiGiorgio et al. | 705/40 |
| 6,547,150 B1 * | 4/2003 | Deo et al. | 235/492 |
| 6,591,229 B1 * | 7/2003 | Pattinson et al. | 702/189 |
| 6,659,345 B2 * | 12/2003 | Sukeda et al. | 235/382 |
| 2002/0029378 A1 | 3/2002 | Larsson | 717/159 |
| 2002/0069065 A1 | 6/2002 | Schmid et al. | 704/270 |

FOREIGN PATENT DOCUMENTS

| | | |
|---|---|---|
| WO | WO 98/19239 | 5/1998 |
| WO | WO 00/08611 | 2/2000 |
| WO | 00/25278 A1 | 5/2000 |
| WO | 00/75775 A2 | 12/2000 |
| WO | WO 01/14960 A2 | 3/2001 |
| WO | 01/60040 A2 | 8/2001 |
| WO | WO 01/88707 A2 | 11/2001 |
| WO | WO 02/33879 A2 | 4/2002 |
| WO | WO 02/35351 A1 | 5/2002 |

OTHER PUBLICATIONS

Mapping Requirements to Architecture: an Experience Report from the VIVIAN Project by Titos Saridakis; Proceedings of the 14th International Conference on Software and Systems Engineering and their Applications, Dec. 2001; pp. 1-6.

Functionality Needed in Middleware for future Mobile Computing Platforms by Kimmo Raatikainen; Middleware for Mobile Computing Workshop held at IFIP/ACM Middleware Conference, Heidelberg, Germany, 2001; 10 Pages.

Aspects & Crosscutting in Layered Middleware Systems by Lodewijk M.J. Bergmans et al.; Trese Group-Center for Telematics and Information Technology (CTIT); pp. 1-3.

Can AOP Support Extensibility in Client-Server Architectures? by Yvonne Coady et al.; European Conference on Object-Oriented Programming (ECOOP); Aspect-Oriented Workshop, Jun. 2001; pp. 1-4.

A Version Model for Aspect Dependency Management by Elke Pulvermüller et al.; J. Bosh (Ed.): GCSE 2001, LNCS 2186, Springer-Verlag Berlin Heidelberg 2001, pp. 70-79.

Draft: Aspect-Design in the Building-Block Method by Jürgen K. Müller, Philips Research Laboratories; International Workshop on Aspect-Oriented Programming at ECOOP, 1992; 3 Pages.

Aspect-Oriented Programming by Silvia Breu; pp. 1-22.

A Layered Approach to Building Open Aspect-Oriented Systems by Paniti Netinant et al.; Communications of the ACM; Oct. 2001; vol. 44, No. 10; pp. 83-85.

Supporting the Design of Adaptable Operating Systems Using Aspect-Oriented Frameworks by P. Netinant et al.; International Conference on Parallel and Distributed Processing Techniques and Applications (PDPTA 2000); Las Vegas, Nevada; Jun. 26-29, 2000; 7 Pages.

* cited by examiner

LAYERED SIM CARD AND SECURITY FUNCTION

This application claims the benefit of now abandoned U.S. Provisional Patent Application Ser. No. 60/357,291 filed on Feb. 15, 2002, U.S. Provisional Patent Application Ser. No. 60/412,756 filed on Sep. 23, 2002, and U.S. Provisional Patent application Ser. No. 60/412,763 filed on Sep. 23, 2002.

BACKGROUND OF THE INVENTION

1. Technical Field of the Invention

The present invention relates generally to the field of wireless telecommunications; and, more particularly, to a smart card and a smart card and security function system for a mobile terminal for a wireless telecommunications system.

2. Description of Related Art

Smart cards are the main secure carriers of private/secret (key) information to authorize electronic access and/or transactions via a mobile terminal of a cellular telecommunications system. In current cellular telecommunications systems, smart cards such as SIM (Subscriber Identity Module) cards and WIM (WAP Identity Module) cards, or combined SIM/WIM cards, are used to securely store user credentials (and keys) to identify the user and to bind the user to a specific transaction, e.g., an electronic purchase. These smart cards comprise so-called ICCs (Integrated Circuit Cards) that are programmed for a specific service/use. Through standardized interfaces (both electrical and logical), a mobile terminal can access information and services provided by the smart card and provide the desired security functions.

Current mobile terminals have only a limited capability to support secure electronic payment services and other secure transactions via a wireless connection; and, in general, smart cards have been used only as carriers of private/secret information and associated services (e.g., electronic signing of data with a private/secret key on the card).

In the future, a mobile terminal will have to handle different smart cards. The lowest level for accessing the information on a smart card can be the mechanical elements that make electrical contact between the mobile terminal and the smart card, or a system that makes a wireless radio or optical (e.g., infrared) contact. By adhering to an API (Application Interface) standard (such as the standard specified in the WIM specifications), mobile terminal software developers can build the driver software through which the security functions in the mobile terminal can gain access to the smart card. Unfortunately, there does not exist one API standard, and this leads to multiple implementations of the software to use the card capabilities. This, in turn, increases the cost of code storage and code development.

Furthermore, due to increased demands for security in mobile terminals, there is and will continue to be a need to handle private/secret data in the mobile terminal. In principle, it is possible to turn the main processing circuit in the mobile terminal into a tamper resistant device such as a smart card. This is not an attractive option, however, as the increased security requirements would effect the design and the production process of the complete ASIC of the main processing circuit (for example, the need for special shielding, tamper detection mechanisms, redesign of signal flow to reduce signal leakage, and the like).

In general, the expected wider use of the capabilities of smart cards requires an efficient system design (software architecture) that allows efficient software development in a mobile terminal in which storage resources are limited and which contribute significantly to the overall cost of the mobile terminal.

SUMMARY OF THE INVENTION

The present invention provides a smart card and a smart card and security function system for a mobile terminal for a wireless telecommunications system that permits an efficient software design in the mobile terminal with a resultant reduction in overall development costs.

A smart card for a mobile terminal for a wireless telecommunications system according to the present invention includes a software services component in which software is organized in at least one functional software unit and in a plurality of software layers arranged in order from software layers providing higher level services to software layers providing lower level services, and at least one software module in each software layer. The smart card further includes means for providing access to information and services provided by the smart card.

It has been discovered that by providing a layered, modular software architecture to implement the functionality on a smart card, more efficient software development in mobile terminals is provided that permits a reduction in overall development costs and facilitates the introduction of enhancements to the mobile terminal.

The software architecture according to exemplary embodiments of the present invention differs from the standard ISO/OSI (ISO Open Systems Interconnection) model in that it includes a plurality of horizontally partitioned functional software units that complement a plurality of vertically partitioned software layers. The horizontal partitioning contributes significantly to the creation of independent modular (service) components.

According to exemplary embodiments of the present invention, the smart card may include payment server applications that utilize software of the software services component of the smart card, or the smart card may have no payment server applications and be controlled directly by the mobile terminal. According to further exemplary embodiments of the invention, the smart card may be removably mounted in a mobile terminal or built-in to the mobile terminal.

Further advantages and specific details of the present invention will become apparent hereinafter from the detailed description given below in conjunction with the following drawings.

DETAILED DESCRIPTION OF THE
EXEMPLARY EMBODIMENTS OF THE
INVENTION

Figure 1:
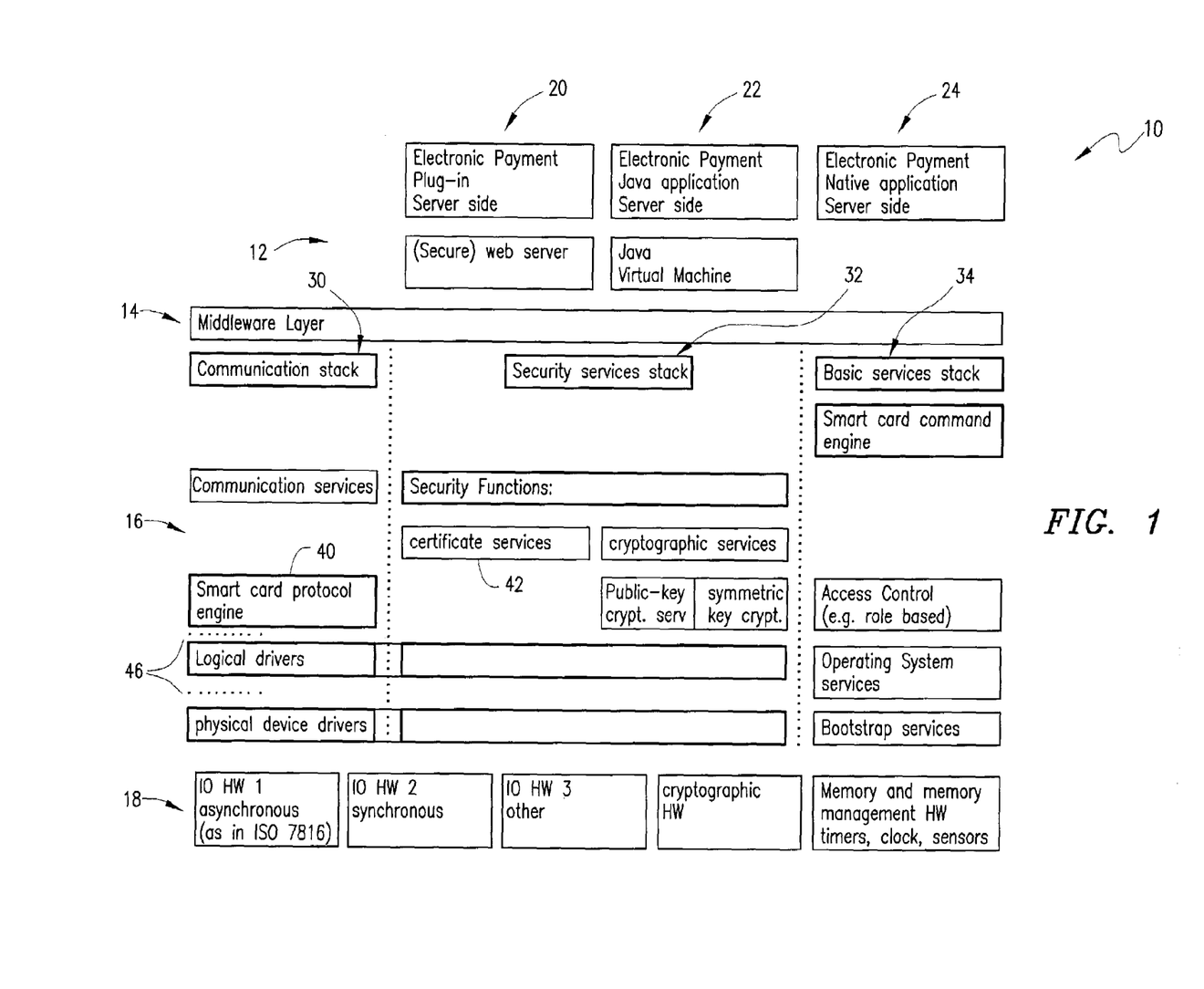
FIG. 1 is a block diagram that schematically illustrates a smart card for a mobile terminal for a wireless telecommunications system according to an exemplary embodiment of the present invention.

FIG. 1 is a block diagram that schematically illustrates a smart card for a mobile terminal for a wireless telecommunications system such as a cellular telecommunications system according to an exemplary embodiment of the present invention. The smart card, which may, for example, comprise a SIM card, a WIM card or a combined SIM/WIM card, is generally designated by reference number 10, and comprises one or more payment services 12 (referred to as payment server applications), an interface component 14, a software services component 16 used by the payment server applications and a hardware component 18.

In the exemplary embodiment illustrated in FIG. 1, three payment server applications are provided, an electronic payment plug-in server application 20, an electronic payment Java server application 22 and an electronic payment native server application 24. These payment server applications are implemented using different execution environments. In current smart cards, only one execution environment may exist on a single smart card (e.g., on a so-called Java card ICC); however, it is anticipated that future smart cards will provide the possibility of supporting different environments. It should be understood, accordingly, that the present invention is intended to cover smart cards having one or more execution environments for implementing one or more payment server applications.

Software services component 16 comprises a plurality of well-structured functional software units for providing services to the payment server applications 12 via the interface component 14. In the illustrated embodiment of FIG. 1, the plurality of functional software units comprise a plurality of vertically oriented functional software stacks including communications services stack 30, security services stack 32 and basic services stack 34.

The interface component 14 preferably comprises a middleware services layer that includes one or more application interfaces (APIs) for one or more payment server applications. The middleware services layer also functions to isolate the software services component 16 of the smart card from the payment server applications 12 except via the one or more interfaces. Accordingly, with the smart card of the present invention, the middleware services layer provides a separation between the server application software and the software of the software services component. As a result, the server application software and the software of the software services component can be developed separately.

As shown in FIG. 1, the software of the software services component 16, in addition to being organized into a plurality of vertical, functional software stacks 30, 32 and 34 as described above, is also arranged to define, together with the server application software, a plurality of horizontal layers arranged in a descending order from a higher level service layer to a lower level service layer.

The highest level layer (the top layer) of the layered architecture comprises the one or more payment server applications 12, and the remaining layers comprise the software layers of the software services component. The software of the software services component is organized into a plurality of software modules, e.g., modules 40 and 42. In software services component 16, a single module can reside in only one functional stack and in only one horizontal layer within that stack. Each layer can contain from one to many modules and all the modules in a particular layer and in a particular functional stack have the same level of abstraction. Communication among the various modules is accomplished via a Software Back Plane (SwBP), such as schematically illustrated at 46, subject to a set of basic rules for module-to-module access. These rules can be summarized as follows:

A software module may invoke functionality in all layer interfaces below its own layer.

There are no limitations for the direction of channel events or data streams. They may go in any direction.

A software module may never invoke functionality in layer interfaces (in the SwBP) above its own layer, independent of to which module the layers belong.

A software module may invoke functionality in the layer interface in its own layer in the same vertical stack.

A software module may invoke functionality in a software module in the same layer in another vertical stack. (This capability is permitted to limit the number of layers in the vertical stacks, and is preferably kept to a minimum.)

There is no hard coupling between the various modules and the interfaces in the SwBP. As a result, modules can be added, removed or changed without affecting other modules in the smart card.

In the exemplary embodiment of FIG. 1 the communications services stack 30 includes modules for providing communication services, a smart card protocol engine, logical drivers and physical device drivers. The security services stack 32 includes modules for providing security functions including certificate services, cryptographic services, public-key cryptographic services and symmetric key cryptographic services; as well as modules for providing logical drivers and physical device drivers (as schematically illustrated in FIG. 1, communication between the logical drivers modules and the physical drivers modules in the communication services stack and the security services stack is permitted notwithstanding that they are in different stacks in order to reduce the overall number of modules that are required in the smart card).

The basic services functional stack 34 includes modules for providing a smart card command engine, access control, operating system services, and bootstrap services.

The hardware component 18 comprises a plurality of hardware units including various IO hardware units, a cryptographic hardware unit and hardware units relating to memory and memory management, various timers, clocks and sensors.

It should be understood that the exemplary smart card shown in FIG. 1 illustrates a realization supporting not only the traditional use of smart cards, but also the use of smart card functionality in a mobile terminal as a built-in (non-removable) component.

Figure 2:
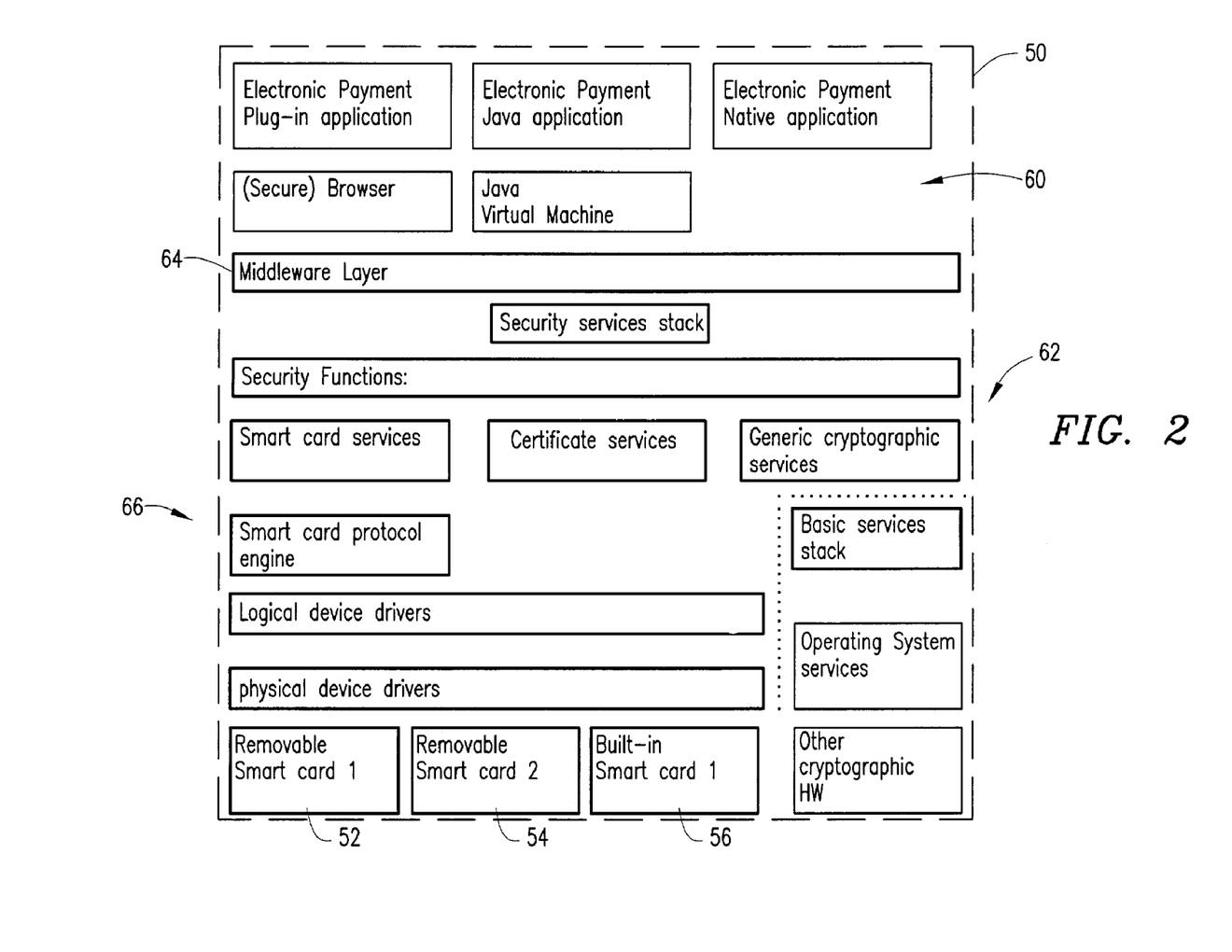
FIG. 2 is a block diagram that schematically illustrates a layered modular smart card and security function system for a mobile terminal for a wireless telecommunications system according to another exemplary embodiment of the present invention.

FIG. 2 is a block diagram that schematically illustrates a layered modular smart card and security function system for a mobile terminal for a wireless telecommunications system according to another exemplary embodiment of the present invention. In the exemplary embodiment of FIG. 2, the mobile terminal is generally designated by reference number 50, and includes a plurality of smart cards including removable smart cards 52 and 54, and a built-in smart card 56. The mobile terminal 50 in FIG. 2 includes a platform system that comprises electronic payment application software 60, and a mobile terminal platform assembly 62 that includes a middleware services layer 64 and a software services component 66. As shown, software services component 66 is also provided with a layered, modular functional architecture, and specific details of the platform system and the layered architecture are described in commonly assigned copending U.S. Patent Application Serial Nos. the disclosures of which are incorporated herein by reference.

In general, it should be appreciated that the software architecture of a smart card according to exemplary embodiments of the present invention is similar to and complements the software architecture described in the above-referenced copending applications in that both are organized into vertically oriented functional software stacks and horizontal software layers.

In FIG. 2, only the relevant parts, being the security services stack and the basic services stack, are illustrated. The shaded boxes in FIG. 2 illustrate software modules that relate to the smart card or the provided smart card services.

Figure 3:
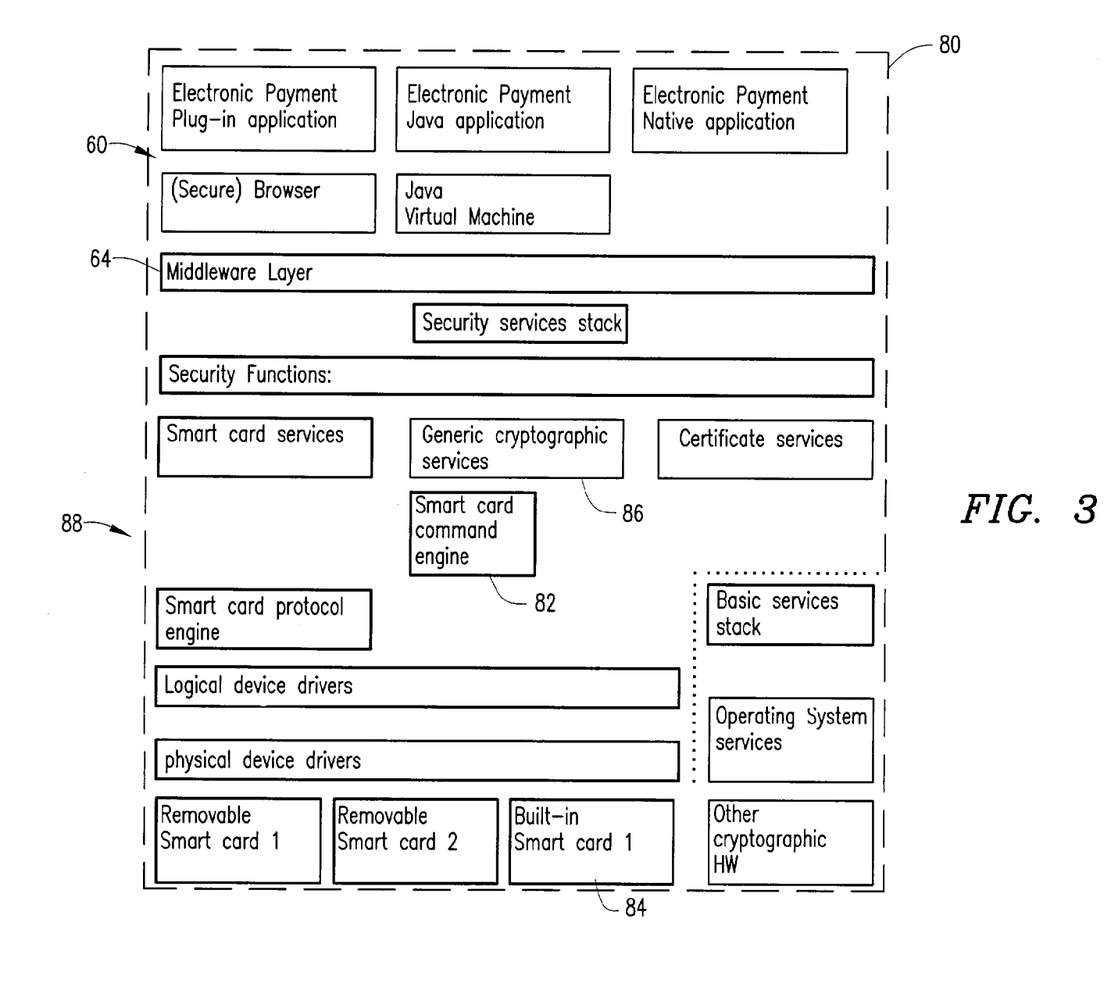
FIG. 3 is a block diagram that schematically illustrates a layered modular smart card and security function system for a mobile terminal for a wireless telecommunications system according to another exemplary embodiment of the present invention.

FIG. 3 is a block diagram that schematically illustrates a layered modular smart card and security function system for a mobile terminal 80 for a wireless telecommunications system according to another exemplary embodiment of the present invention. The system of FIG. 3 extends the smart card and security function system of FIG. 2 with the capability of directly addressing the smart card command engine module (identified by reference number 82 in FIG. 3). The embodiment of FIG. 3 thus realizes a straightforward method for the mobile terminal to utilize the cryptographic hardware of a smart card, for example, the built-in smart card 84. FIG. 3 also illustrates the advantage of the layered, modular functional approach as it suffices to add only one module to extend the generic cryptographic services module 86 of the software services component 88 of the mobile terminal 80.

Figure 4:
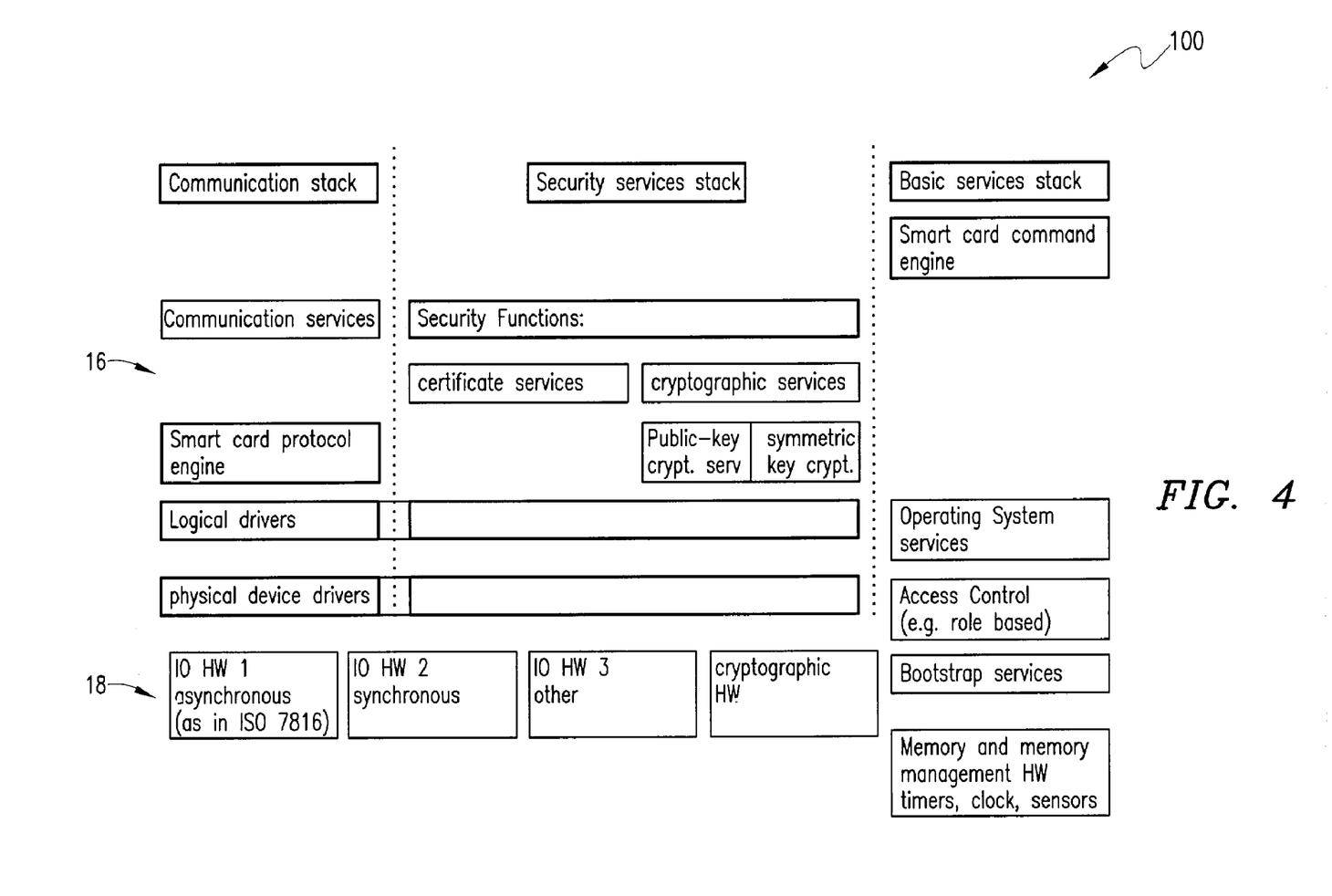
FIG. 4 is a block diagram that schematically illustrates a smart card for a mobile terminal for a wireless telecommunications system according to another exemplary embodiment of the present invention.

FIG. 4 is a block diagram that schematically illustrates a smart card for a mobile terminal for a wireless telecommunications system according to another exemplary embodiment of the present invention. FIG. 4 illustrates a smart card 100 that has no payment server applications, but is controlled directly by the mobile terminal. As shown, because the smart card has no payment server applications, the smart card also does not require the middleware services layer, and comprises only the software services component 16 and the hardware component 18. As in the embodiment of FIG. 1, the smart card may be built-in or removable from the mobile terminal.

Figure 5:
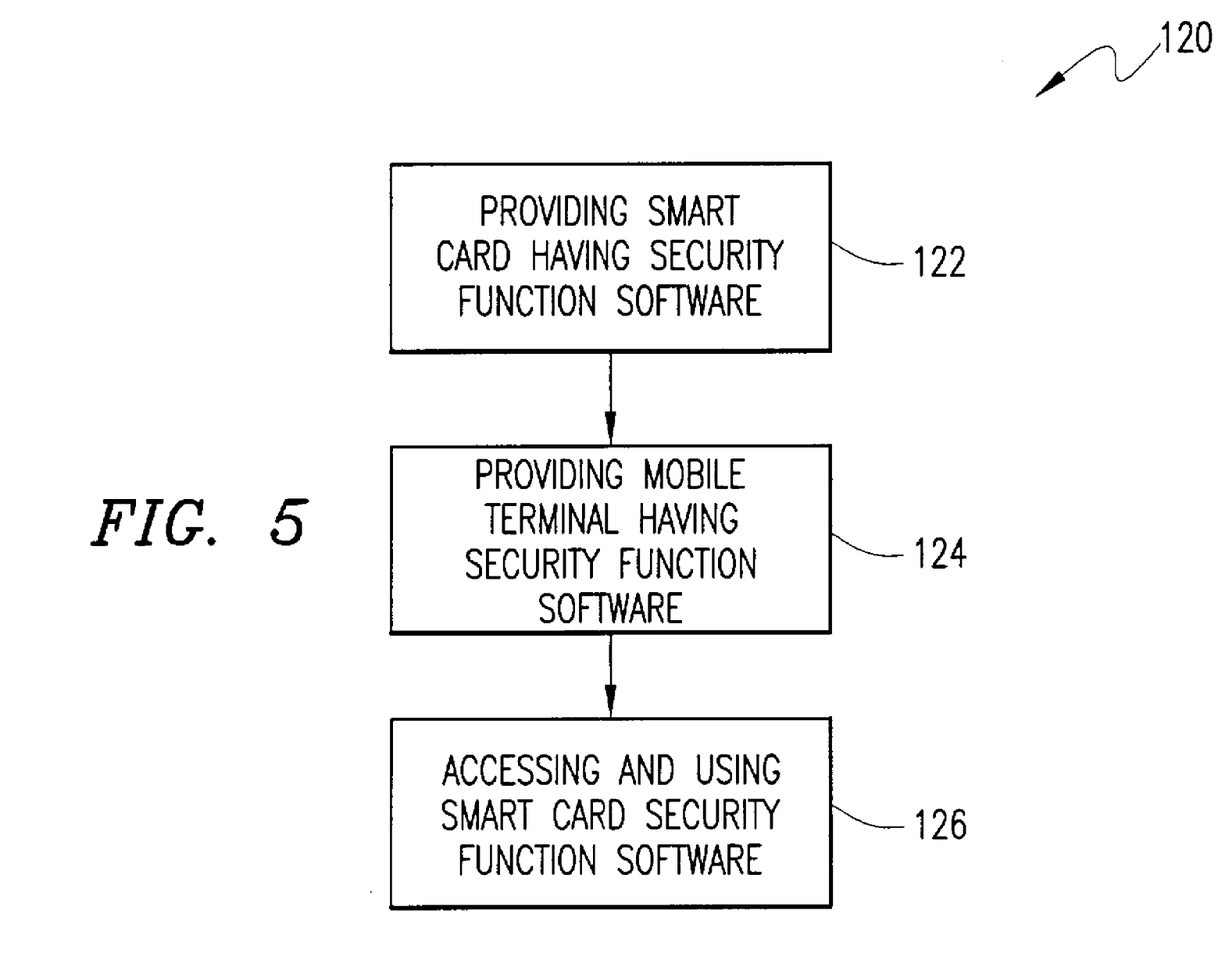
FIG. 5 is a flow chart that illustrates steps of a method for providing a security function for a mobile terminal for a wireless telecommunications system according to another exemplary embodiment of the present invention.

FIG. 5 is a flow chart that illustrates steps of a method for providing a security function for a mobile terminal for a wireless telecommunications system according to another exemplary embodiment of the present invention. The method is generally designated by reference number 120 and includes the steps of providing a smart card that has security function software (step 122), and providing a mobile terminal that has security function software (step 124). The smart card security function software is organized in at least one functional software unit and in a plurality of software layers arranged in order from software layers providing higher level services to software layers providing lower level services, and at least one software module in each software layer. The method further includes the step of the mobile terminal accessing and using information and services provided by the smart card to provide a desired security function for the mobile terminal (step 126). As mentioned previously, the smart card can be built-in to the mobile terminal or may be a separate component adapted to be removably mounted in the mobile terminal.

In general, the present invention provides a smart card for a mobile terminal for a wireless telecommunications system that provides for a reduction in software development costs for the mobile terminal, not only during initial design and testing but also during the design and introduction of upgrades or other enhancements, i.e., the ability to support additional smart cards or additional functionality.

While what has been described constitutes exemplary embodiments of the present invention, it should be recognized that the invention can be varied in many ways without departing therefrom. Because the invention can be varied in numerous ways, it should be understood that the invention should be limited only insofar as is required by the scope of the following claims.

We claim:

1. A smart card for a mobile terminal for a wireless telecommunications system, comprising:
    a software services component including software organized in a plurality of vertical functional software stacks and in a plurality of horizontal software layers arranged in order from software layers providing higher level services to software layers providing lower level services,
    at least one software module, wherein each of the at least one software module resides in only one vertical functional software stack and in only one horizontal software layer;
    means for providing access to information and services provided by the smart card;
    a plurality of payment server applications, wherein the plurality of payment server applications includes an electronic payment plug-in server application, an electronic payment Java server application, and an electronic payment native server application; and
    a middleware services layer for providing an interface between each of the plurality of payment server applications and the software services component.

2. A smart card and security function system for a mobile terminal for a wireless telecommunications system, comprising:
    a mobile terminal,
    a smart card adapted to be received in the mobile terminal, the smart card including a software services component including software organized in a plurality of vertical functional software stacks and in a plurality of horizontal software layers arranged in order from software layers providing higher level services to software layers providing lower level services;
    at least one software module, wherein each of the at least one software module resides in only one vertical functional software stack and in only one horizontal software layer;
    security function software in the mobile terminal;
    access means by which the mobile terminal can access information and services provided by the smart card to provide a desired security function;
    the smart card further including at least one payment server application and a middleware services layer for providing an interface between the at least one payment server application and the software services component, the at least one payment server application comprising a plurality of payment server applications; and
    the plurality of payment server applications including an electronic payment plug-in server application, an electronic payment Java server application, and an electronic payment native server application.

* * * * *

UNITED STATES PATENT AND TRADEMARK OFFICE
CERTIFICATE OF CORRECTION

| | |
|---|---|
| PATENT NO. | : 7,240,830 B2 |
| APPLICATION NO. | : 10/360011 |
| DATED | : July 10, 2007 |
| INVENTOR(S) | : Möller et al. |

It is certified that error appears in the above-identified patent and that said Letters Patent is hereby corrected as shown below:

On the title page item (75), under "Inventors", in Column 1, Line 2, delete "Kalchrouth" and insert -- Henfenfeld --, therefor.

In Column 5, Line 8, after "Serial Nos." insert -- 10/359835 and 10/359911, --.

In Column 6, Line 51, in Claim 2, delete "laver" and insert -- layer --, therefor.

Signed and Sealed this

Seventeenth Day of June, 2008

JON W. DUDAS
*Director of the United States Patent and Trademark Office*